April 14, 1936.  C. K. LINGO  2,037,637

ATMOSPHERE TESTING DEVICE

Filed March 20, 1935

Inventor
Charles K. Lingo

By Ralph R. Browning
Attorney

Patented Apr. 14, 1936

2,037,637

UNITED STATES PATENT OFFICE 2,037,637

ATMOSPHERE TESTING DEVICE

Charles K. Lingo, Miami, Fla.

Application March 20, 1935, Serial No. 12,070

7 Claims. (Cl. 73—24)

This invention relates to a device for determining the condition of the atmosphere, and more particularly has reference to a device for determining what degree of comfort or discomfort would exist as a result of the temperature and moisture content of the atmosphere in any given location.

In the past, various means have been devised for obtaining the information above indicated. These have, for the most part, been based on the simultaneous use of a dry bulb thermometer and a wet bulb thermometer, and in some instances some special means for coordinating the values indicated by the two thermometers.

In nearly every instance the prior devices have involved the use of some moving part in the coordination of the wet and dry bulb thermometer readings. Some have provision for moving one or both thermometers with respect to the coordinating means, depending upon the readings of such thermometers. Others are so arranged that it is necessary for the operator to read the thermometers and then apply the values obtained therefrom to a coordinating means not correlated to the thermometers.

It is possible for one who is technically qualified to work out from a set of wet and dry bulb thermometer readings such information as may be required with regard to the relative humidity, effective temperature, and whether or not the existing conditions would be comfortable. The prior devices referred to above relate to mechanical aids for computing one or more of these factors, but in no case is it possible to obtain the desired results without the manipulation of some movable part, or the necessity of taking a set of values from wet and dry bulb thermometers and applying them to a separate coordinating means.

The present invention is intended for use by salesmen and others in testing and demonstrating to persons usually unfamiliar with such matters the need for air conditioning. It is also intended that it may be used by individuals having no previous training for testing the need for air conditioning on their own premises, for instance, without the necessity for employing an experienced technician.

It is therefore an object of this invention to provide a device for the purpose set forth which will be so simple in operation as to require no skill or experience and a minimum of instruction on the part of the operator or person desiring to obtain information therefrom.

It is a further object of this invention to provide a device in which the results may be obtained by a mere inspection without necessity on the part of the operator or observer for manipulating any part or performing any calculation in deriving the desired results from the wet and dry bulb thermometers.

Another object is to provide a device of the type set forth in which no moving parts are included save only a means for moving the device through the air to cause the thermometers to register the true values.

Another object is to provide such a device which will be inexpensive to manufacture, simple and durable in construction, and accurate and efficient in operation.

One other object is to provide such a device in which the condition of the atmosphere shall be readable in terms of comfort or discomfort directly without necessity for first reading in terms of relative humidity, etc., and then translating into terms of comfort or discomfort.

With the above and other objects in view, this invention consists in general of the parts and combinations hereinafter more specifically set forth and described, and shown in the accompanying drawing. It is to be understood however, that the particular embodiment described and shown is by way of example and illustration and not by way of limitation.

Figure 1:
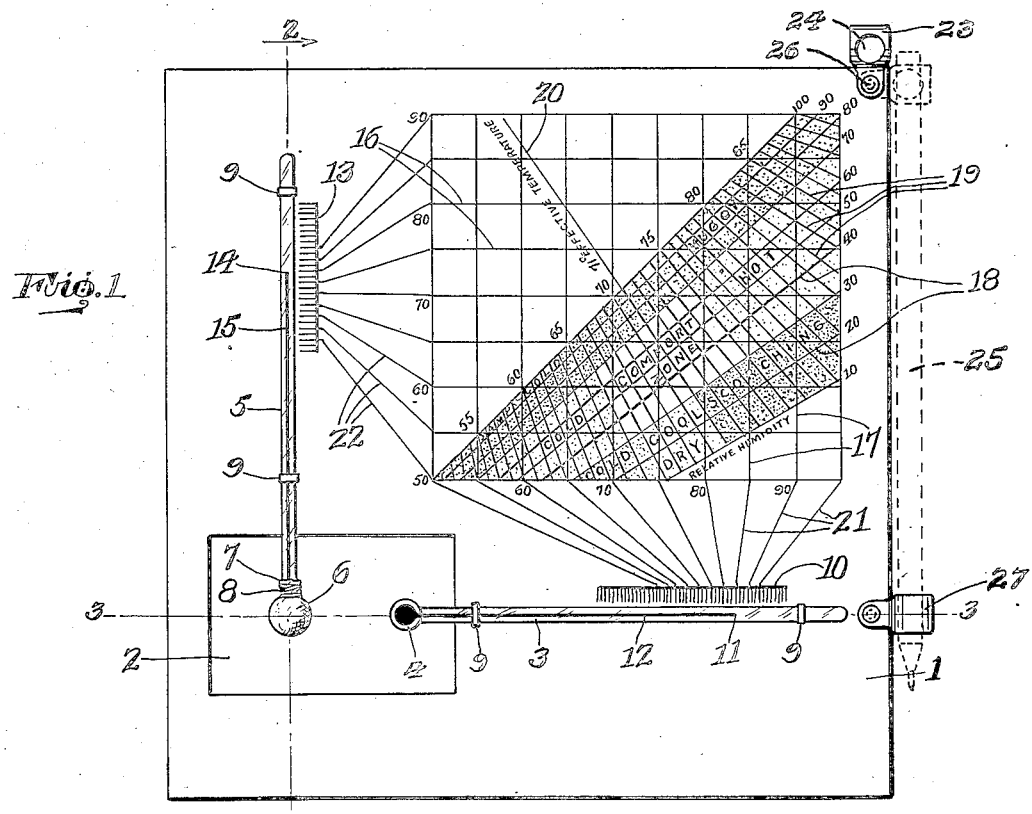
Figure 1 is a front elevation of the embodiment of this invention which has been selected for the purpose of illustration.

Referring now more particularly to the drawing, the numeral 1 designates a support which may be formed of any suitable material, such as wood, composition board, or the like, and which is preferably substantially rigid. It is of flat formation, and is provided, adjacent one corner thereof with an opening 2 of considerable size extending therethrough.

Mounted on this base in a horizontal position is a dry bulb thermometer 3 having its bulb 4 disposed to the left as viewed in Figure 1, and preferably within the right end portion of the opening 2. Likewise mounted, but in a vertical position, is a wet bulb thermometer 5 having its bulb 6 disposed in spaced relation with respect to the bulb 4 and within the left end portion of the opening 2 so that air may circulate freely about both bulbs. As is customary with wet bulb thermometers, the construction of the thermometer 5 is similar in all respects to a dry bulb thermometer with the exception that the bulb 6 is wrapped in a small piece of cloth 7 or other material capable of absorbing and forming an evaporating surface for water. Such piece of cloth is held in place by means of a cord or band 8. The thermometers themselves are held in place on the support 1 by means of bands or rivets 9 which pass around the thermometer stems and through the support in a well known manner.

Arranged alongside or in similar cooperating relation to the dry bulb thermometer stem is a thermometer scale 10 having relatively small divisions, so that it may be used to show relatively small differences in position of the indicating end 11 of the column 12 of thermometer liquid. Likewise, there is provided a similar scale 13 adjacent the wet bulb thermometer 5, for the purpose of judging the position of the end 14 of the column 15.

For the purpose of coordinating the results of the two thermometers, the support 1 is provided on its front face with coordinating indicia in the form of a chart. This chart consists of a series of horizontal lines 16 representing various wet bulb temperatures, a series of vertical lines 17 intersecting said horizontal lines and representing dry bulb temperatures, a series of iso-relative humidity lines 18 drawn with said temperature lines as coordinates, and a series of iso-effective temperature lines 19 likewise drawn with said temperature lines as coordinates. Certain of the iso-relative humidity lines and certain of the iso-effective temperature lines are selected to serve as boundaries for various zones of comfort, and these are labeled "Damp Cold", "Cold", "Cool Dry", "Comfort Zone", "Muggy" etc. to indicate various degrees of comfort or discomfort due to the condition of the atmosphere. These zones are also preferably colored with distinctive colors to render them more easily discernible. Numerals may, if desired, be provided for indicating the numerical values of the various temperature and relative humidity lines, although for the principal purposes of this invention this is not essential. The line 20 indicating 71° effective temperature is preferably extended above the 100% relative humidity line to provide for its ready location in reading the chart.

For the purpose of correlating the two thermometers with the chart to enable them to be read and coordinated directly thereon, the two series of lines 21 and 22 are provided. It is noted that the distances between the temperature lines 16 and 17 on the chart are much greater than the distances between the corresponding points on the thermometer scales. This, of course, is so that the chart may be more easily read. Because of this fact, the lines 21 and 22 diverge as they approach the chart so that they may join the respective temperature lines to corresponding points on the thermometer scales. This enables an operator to follow with his eye the lines corresponding to any wet and dry bulb temperatures indicated on the respective thermometers, and to locate the point of their intersection. By noting the zone within which such point of intersection falls the degree of comfort or discomfort due to the condition of the atmosphere may be at once determined.

Figure 2:
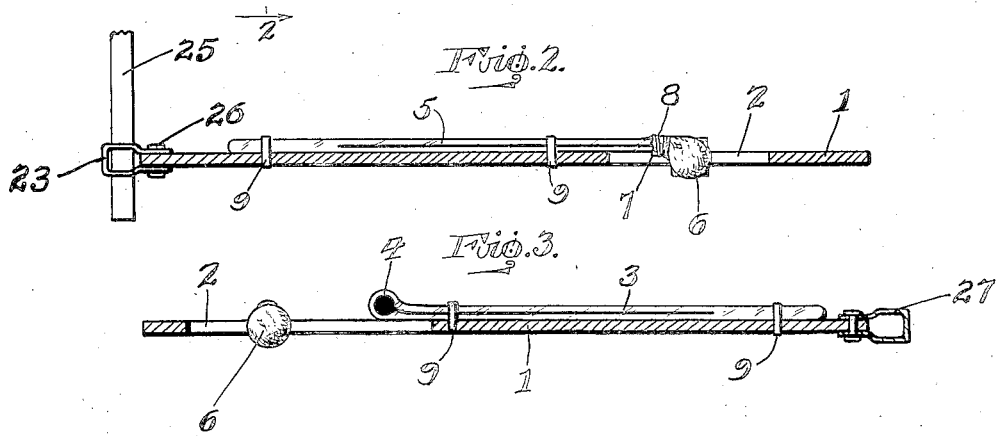
Figure 2 is a cross section taken along the line 2—2 of Figure 1.
Figure 3:
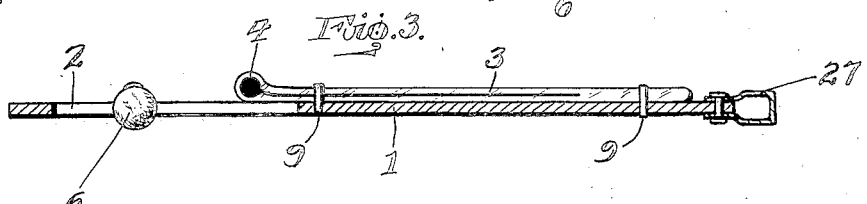
Figure 3 is a cross section taken along the line 3—3 of Figure 1.

It is desirable that the device set forth be moved rapidly through the air for a brief time before reading, and in order to render this more convenient, it is provided with a bracket 23 adjacent its upper right hand corner, which bracket is formed with an opening 24 adapted to rotatably receive a pencil 25 or similar member adapted to serve as a handle. The opening 24 has its axis disposed at right angles to the plane of the support 1 and is of sufficient size to loosely receive the handle member 25 and permit relative rotation thereof. The bracket 23 is U-shaped as shown in Figure 2, and is pivotally secured to the support 1 by the rivet 26 or the like so that it may be swung around the upper right hand corner to the dotted line position shown in Figure 1. A second bracket 27, like 23 except for the opening 24, may be mounted lower along the right side of the support. Both brackets are formed of spring material and are together adapted to receive and resiliently retain the handle 25 as shown, in the plane of the support 1, when the handle is not in use.

In operation, when it is desired to determine the condition of the atmosphere in any given location, the cloth 6 on the wet bulb thermometer is moistened with water. The handle 25 is then removed from the brackets and inserted in the opening 24, after which the device is held by the handle 25 and rotated in the plane of the support 1 for a sufficient length of time to permit the wet bulb thermometer reading to become constant. Rotation is then stopped and the lines 21 and 22 leading from the upper ends of the respective thermometer liquid columns are followed with the eye to the point of their intersection. It is then only necessary to note the zone of comfort or discomfort within which this point falls in order to determine the condition of the atmosphere and whether or not there is need for air conditioning. One need not read the temperature indicated by either thermometer or any other intermediate value in obtaining the final result. It is not necessary to move either thermometer with respect to the remainder of the device or to operate any calculating device, nor is it necessary to retain any values in mind for reference to another part of the apparatus. The construction is inexpensive, durable, employs a minimum of moving parts, and is simple to operate. At the same time, it is accurate and efficient and does not require readjustment from time to time.

It will be readily apparent that the device set forth by way of illustration provides a means for carrying out all of the objects of this invention in an efficient and practical manner. It will be apparent, however, that various changes may be made in the construction and arrangement of parts of this device without departing from the spirit and scope of this invention as set forth in the appended claims. Accordingly, this invention is not to be limited in its scope except by the prior art and by the terms of the appended claims.

Having described my invention, I claim:

1. In a device for determining the condition of the atmosphere, a support having on one face thereof a chart consisting of two intersecting series of spaced lines representing dry and wet bulb temperatures respectively, and a series of iso-relative humidity lines and a series of iso-effective temperature lines intersecting to form zones on said chart representing various degrees of comfort or discomfort, said support also having thereon a dry bulb thermometer scale and a wet bulb thermometer scale, and lines connecting various points on said respective scales with corresponding dry and wet bulb temperature lines on said chart, a dry bulb thermometer mounted on said support in cooperative relation with the dry bulb thermometer scale, and a wet bulb thermometer mounted on said support in cooperative relation with said wet bulb thermometer scale, whereby the lines representing the respective dry and wet bulb temperatures may be followed directly from the respective thermometers to the point of the intersection of such lines on the chart to determine directly by the zone within such point may fall, the degree of comfort or discomfort existing due to the condition of the atmosphere.

2. In a device for determining the condition of the atmosphere, a support having on one face thereof a chart consisting of two intersecting series of spaced lines representing dry and wet bulb temperatures respectively, and a series of iso-relative humidity lines and a series of iso-effective temperature lines intersecting to form zones on said chart representing various degrees of comfort or discomfort, a dry bulb thermometer mounted on said support in position to indicate the dry bulb temperature line on the chart which corresponds to the existing dry bulb temperature, and a wet bulb thermometer mounted on said support in a position to indicate the wet bulb temperature line on said chart which corresponds to the existing wet bulb temperature, whereby the lines representing the respective dry and wet bulb temperatures may be followed directly from the respective thermometers to the point of the intersection of such lines on the chart to determine directly by the zone within which such point may fall, the degree of comfort or discomfort existing due to the condition of the atmosphere.

3. In a device for determining the condition of the atmosphere, a support, a dry bulb thermometer fixedly mounted on said support, and a wet bulb thermometer fixedly mounted on said support, said support having coordinating indicia fixedly arranged thereon and comprising ordinates and abscissae, one of said thermometers being in cooperative relation with respect to said ordinates to be readable directly on said ordinates, and the other of said thermometers being in cooperative relation with respect to said abscissae to be readable directly on said abscissae, whereby the temperatures indicated on said thermometers may be directly coordinated with each other on said indicia without necessity for reading the values of such temperatures.

4. In a device for determining the condition of the atmosphere, a support, a dry bulb thermometer fixedly mounted on said support and a wet bulb thermometer fixedly mounted on said support, said support having coordinating indicia fixedly arranged thereon and including two intersecting series of relatively widely spaced lines representing dry and wet bulb temperatures respectively, a scale having relatively small divisions located in cooperative relation with respect to each of said thermometers, and diverging lines extending from various points on each of said scales to corresponding temperature lines, whereby the relatively small changes in temperature indicated on the relatively small divisions of said thermometer scales may be immediately read on the more widely spaced lines and the temperatures indicated on said two thermometers may be directly coordinated with each other on said indicia without necessity for reading the values of such temperatures.

5. A chart for use in correlating wet and dry bulb thermometer readings, said chart comprising a substantially rigid support having on one surface thereof sets of coordinates representing various wet and dry bulb thermometer readings respectively, wet and dry bulb thermometer scales spaced from said coordinates, lines joining various of said coordinates to corresponding points on said thermometer scales, and intersecting iso-relative humidity lines and iso-effective temperature lines forming various labeled zones of comfort or discomfort on said chart.

6. In a device for determining the condition of the atmosphere, a relatively flat rigid support, a dry bulb thermometer fixedly mounted on said support, a wet bulb thermometer fixedly mounted on said support, said support having coordinating indicia fixedly arranged thereon, parts of which are in cooperative relation with said thermometers respectively for directly coordinating the temperatures indicated thereon, a bracket pivotally mounted on said support adjacent one edge thereof and having an opening therein in a direction transverse to the plane of said support, a handle adapted to be rotatably engaged in said opening, whereby said support and the parts fixedly mounted thereon may be rapidly rotated in the plane of the support to cause the thermometers to assume true readings, and a second bracket mounted on said support in spaced relation to said first bracket, said brackets each having an opening therethrough in the plane of said support and together adapted to receive and retain said handle in the plane of said support when it is not in use.

7. In a device for determining the condition of the atmosphere, a relatively flat rigid support, a dry bulb thermometer fixedly mounted on said support, a wet bulb thermometer fixedly mounted on said support, said support having coordinating indicia fixedly arranged thereon, parts of which are in cooperative relation with said thermometers respectively for directly coordinating the temperatures indicated thereon, a bracket mounted on said support adjacent one edge thereof and having an opening therein in a direction transverse to the plane of said support, and a handle adapted to be rotatably engaged in said opening, whereby said support and the parts fixedly mounted thereon may be rapidly rotated in the plane of the support to cause the thermometers to assume true readings.

CHARLES K. LINGO.